(12) United States Patent
Ihlemann et al.

(10) Patent No.: US 11,059,127 B2
(45) Date of Patent: Jul. 13, 2021

(54) ABLATIVE PRODUCTION DEVICE AND METHOD FOR A PERIODIC LINE STRUCTURE ON A WORKPIECE

(71) Applicant: LASER-LABORATORIUM GOETTINGEN E.V., Goettingen (DE)

(72) Inventors: Juergen Ihlemann, Goettingen (DE); Joerg Meinertz, Goettingen (DE); Lars Henning Stark, Jena (DE)

(73) Assignee: INSTITUT FÜR NANOPHOTONIK GÖTTINGEN E.V., Goettingen (DE)

( * ) Notice: Subject to any disclaimer, the term of this patent is extended or adjusted under 35 U.S.C. 154(b) by 442 days.

(21) Appl. No.: 15/754,866

(22) PCT Filed: Aug. 25, 2016

(86) PCT No.: PCT/EP2016/070029
§ 371 (c)(1),
(2) Date: Feb. 23, 2018

(87) PCT Pub. No.: WO2017/032818
PCT Pub. Date: Mar. 2, 2017

(65) Prior Publication Data
US 2018/0236596 A1 Aug. 23, 2018

(30) Foreign Application Priority Data

Aug. 26, 2015 (DE) .......................... 102015216342.3

(51) Int. Cl.
| | |
|---|---|
| *B23K 26/00* | (2014.01) |
| *B23K 26/067* | (2006.01) |
| *B23K 26/073* | (2006.01) |
| *B23K 26/0622* | (2014.01) |

(Continued)

(52) U.S. Cl.
CPC ........ *B23K 26/0006* (2013.01); *B23K 26/066* (2015.10); *B23K 26/067* (2013.01);
(Continued)

(58) Field of Classification Search
CPC ............ B23K 26/0006; B23K 26/0624; B23K 26/066; B23K 26/067; B23K 26/355; B23K 26/359; B23K 26/0738
(Continued)

(56) References Cited

U.S. PATENT DOCUMENTS

| | | | |
|---|---|---|---|
| 3,742,182 A | 6/1973 | Saunders | |
| 5,032,003 A | 7/1991 | Antes | |

(Continued)

FOREIGN PATENT DOCUMENTS

| | | |
|---|---|---|
| CA | 2 281 039 A1 | 2/2000 |
| CN | 1280677 A | 1/2001 |

(Continued)

OTHER PUBLICATIONS

Chinese Office Action and Search Report, dated Jun. 6, 2019, for Chinese Application No. 201680049208.X, along with an English translation of the Chinese Office Action.

(Continued)

*Primary Examiner* — Tuan N Nguyen
(74) *Attorney, Agent, or Firm* — Birch, Stewart, Kolasch & Birch, LLP

(57) ABSTRACT

The invention relates to an ablative production device and method for a periodic line structure on a workpiece. The device comprises a pulsed laser for generating ablative light, a phase mask arranged in the beam path of the ablative light, imaging optics arranged on an optical axis and a holder to hold the workpiece in an image plane. The phase mask produces a plurality of equidistant parallel lines in an object plane by interference and suppresses an order of diffraction parallel to the optical axis. The optical axis is perpendicular to the object plane. The imaging optics comprises a cylindrical lens, which is aligned in parallel to the lines and is designed to image the object plane into the image plane.

11 Claims, 4 Drawing Sheets

(51) Int. Cl.
B23K 26/066 (2014.01)
B23K 26/359 (2014.01)
B23K 26/352 (2014.01)

(52) U.S. Cl.
CPC ...... B23K 26/0624 (2015.10); B23K 26/0738 (2013.01); B23K 26/355 (2018.08); B23K 26/359 (2015.10)

(58) Field of Classification Search
USPC .................................................. 219/121.68
See application file for complete search history.

(56) References Cited

U.S. PATENT DOCUMENTS

| | | | |
|---|---|---|---|
| 5,768,454 A * | 6/1998 | Chesnoy | G02B 6/02138 359/563 |
| 6,212,012 B1 | 4/2001 | Tanaka | |
| 6,549,705 B1 | 4/2003 | Laming et al. | |
| 6,795,198 B1 | 9/2004 | Fuchs et al. | |
| 2005/0073748 A1 | 4/2005 | Hayashi et al. | |
| 2009/0046757 A1 | 2/2009 | Miyairi et al. | |

FOREIGN PATENT DOCUMENTS

| | | | | |
|---|---|---|---|---|
| CN | 102736451 A | | 10/2012 | |
| GB | 2272075 A | * | 5/1994 | ............. G03F 7/001 |

OTHER PUBLICATIONS

Abbott et al., "New techniques for laser micromachining MEMS devices", Proceedings of SPIE—The International Society for Optical Engineering, 2002, vol. 4760, 8 pages.

Boehlen et al., "Advanced Laser micro-structuring of super large area optical films", Proceedings of SPIE—The International Society for Optical Engineering, 2005, vol. 5720, 8 pages.

Coelho et al., "Advances in Optical Fiber Laser Micromachining for Sensors Development", In: Harun et al. (Ed.), Current Developments in Optical Fiber Technology, INTECH, 2013, pp. 375-401.

German Search Report for DE 10 2015 216 342.3, dated Mar. 1, 2016.

International Search Report for PCT/EP2016/070029(PCT/ISA/210) dated Jan. 9, 2017.

Ma et al., "Mikrostrukturierung auf nicht ebenen Glasoberflächen mittels Interferenzlithographie", DGaO-Proceedings 2010, 2 pages.

Mäder et al., "Nano-Patterning by Diffraction Mask-Projection Laser Ablation", Journal of Laser Micro/Nanoengineering, 2008, vol. 3, No. 1, pp. 9-13.

Meinertz et al., "Micron and sub-micron gratings on glass by UV laser ablation", Physics Procedia, 2013, vol. 41, pp. 708-712.

Pedder et al., "Pulsed Laser Ablation for Volume Micro-Optical Arrays on Large Area Substrates", Proceedings of SPIE—The International Society for Optical Engineering, 2007, vol. 6462, 7 pages.

Voigtländer et al., "Ultrashort pulse inscription of tailored fiber Bragg gratings with a phase mask and a deformed wavefront [Invited]", Optical Materials Express, 2011, vol. 1, No. 4, pp. 633-642.

Written Opinion of the International Searching Authority for PCT/EP2016/070029 (PCT/ISA/237) dated Jan. 9, 2017.

Chinese Office Action and Search Report dated Mar. 27, 2020, for Chinese Application No. 201680049208.X, with partial translation.

* cited by examiner

ABLATIVE PRODUCTION DEVICE AND METHOD FOR A PERIODIC LINE STRUCTURE ON A WORKPIECE

TECHNICAL FIELD

A technique for the production of periodic structures by means of electromagnetic radiation is described. In particular, without being restricted thereto, a device and a method for the production of periodic line structures by ablation are described.

PRIOR ART

Surface regions can be visually or haptically identified by the structuring of surfaces. Furthermore, diffractive structures can appear differently coloured or generate a colour progression depending on the perspective. As well as having decorative purposes, structured surfaces can also be dirt-repellent, for example dewetting.

The document "Micron and Sub-Micron Gratings on Glass by UV Laser Ablation", J. Meinertz et al., Physics Procedia, volume 41, pages 708-712, for the conference "Lasers in Manufacturing 2013" describes a conventional production of parallel lines by means of a diffraction grating. However, a considerable portion of the radiation output of a processing laser is lost at the diffraction grating. In addition, a Schwarz-schild optics with the principal maximum of the diffraction grating masks out another large part of the radiation output.

Furthermore, a laser irradiation device is known from US 2009/0046757, by means of which positions of crystal grain boundaries produced in laser crystallisation can be controlled.

SUMMARY

A possible object of the present invention is thus to provide a technique for the more efficient production of microstructures.

According to one aspect, a device for the ablative production of a periodic line structure on a workpiece is provided. The device comprises a pulsed laser for generating ablative light; a phase mask arranged in the beam path of the ablative light, which is formed to produce a plurality of equidistant parallel lines in an object plane by interference and to suppress an order of diffraction parallel to the optical axis, wherein the optical axis is perpendicular to the object plane; imaging optics arranged on the optical axis with a cylindrical lens, which is aligned in parallel to the lines and is formed to image the object plane into an image plane; and a holder, which is formed to arrange the workpiece in the image plane.

The imaged equidistant parallel lines can produce the periodic line structure on the workpiece by ablation. The periodic line structure on the workpiece can be periodic locally or in sections. The production can be the result of several pulses of the ablative light. For example, the periodic line structure can be produced in a coherent region or in several respectively coherent regions on the workpiece.

The image plane can be perpendicular to the optical axis. The object plane and the image plane can be parallel.

A direction of the equidistant parallel lines defines a longitudinal direction. The optical axis and the longitudinal direction define a plane of symmetry. A direction perpendicular to the plane of symmetry defines a transverse direction.

Beams can be described (e.g. for a plane perpendicular to the optical axis) by an angle $\theta$ between beam and optical axis (or plane of symmetry). Alternatively or in addition, beams can be described (e.g. for a plane perpendicular to the optical axis) by a distance s (e.g. in the transverse direction) between beam and optical axis (or plane of symmetry).

The phase mask can modulate the light of the laser falling onto it with respect to its phase in the object plane. The phase mask can modulate a phase shift according to a rectangular profile upon the incident light in the transverse direction. In the longitudinal direction the phase mask can have an unchanging phase shift (for each trans-verse direction respectively).

The imaged lines can be produced by interference. The imaged lines can be produced in the image plane by interference of two beams (a 2-beam interference). The phase mask can generate the two beams. Each of the beams can correspond to an order of diffraction respectively. The (suppressed) order of diffraction parallel to the optical axis is also described as "paraxial" light. Orders of diffraction that are not parallel to the optical axis are also described as "off-axis" light.

For example, the two interfering beams (for example, the non-suppressed orders of diffraction captured by the imaging optics) can comprise at least 75%, for example 80% to 90% of the light (e.g. with respect to the total radiation output after the phase mask or with respect to the laser output). Alternatively or in addition, a proportion of the paraxial light can be smaller than 10%, smaller than 5% or smaller than 1% (e.g. with respect to the total radiation output after the phase mask or with respect to the laser output). The phase mask can make it possible to provide as much light output as possible in the off-axis light (in the orders of utilisation) for an efficient utilisation of the ablative light.

Due to the small proportion of the paraxial light, a high-contrast line structure can be facilitated. Optionally an aperture (or a mirror) can be arranged between the phase mask and imaging optics, e.g. directly on the imaging optics, for blocking (or for reflection out of the beam path) of the paraxial light. The two beams cannot overlap between phase mask and imaging optics in a region before the imaging optics. The aperture or the mirror can be arranged in the region.

An at least predominant portion of the off-axis light can increase a resolution of the imaging. For example, finer line structures can be produced. Alternatively or in addition, the suppression of the paraxial light can increase a depth of field of the imaging. The depth of field can be 50 µm to 250 µm, for example 100 µm. Alternatively or in addition, the suppression of the paraxial light and/or the preponderance of the off-axis axis light can reduce or prevent the influence of a geometric (e.g. cylindrical or spherical) aberration of the cylindrical lens on the imaging of the equidistant lines.

The object plane can substantially correspond to a plane of the phase mask and/or lie in a Talbot region of the phase mask.

The imaging optics can image the plurality of equidistant parallel lines into the image plane. The imaging optics can be formed for reducing imaging. The imaging can be formed to reduce distances in the transverse direction. A distance of the imaged lines in the image plane can be smaller than the distance of the equidistant lines in the object plane.

The imaging optics can comprise other optical elements (for example, lenses). For example, the imaging optics can comprise a doublet of two cylindrical lenses with correspondingly combined refractive power.

The phase mask can be light-efficient. The phase mask can have a transmission factor of at least 75%, for example 80% to 90%. The light yield of the phase mask can be considerably higher than the light yield of a diffraction grating, for example a multiple. Furthermore, the use of the phase mask can suppress the paraxial light by interference without blocking or absorbing a principal maximum. The high transmission factor can counteract a heating or ageing of the phase mask.

The laser and/or the phase mask can be formed to produce the plurality of equidistant lines in the object plane over a width X. The orders of diffraction (e.g. the at least substantially non-suppressed orders of diffraction) emanating from the phase mask can be spaced from the optical axis over the entire width X in the imaging optics. For example, the orders of diffraction (e.g. the at least substantially non-suppressed orders of diffraction) captured by the imaging optics can be spaced by more than the width X from the optical axis.

The laser and/or the phase mask can be formed to produce the plurality of equidistant lines in the object plane over a first width. The orders of diffraction can be spaced from the optical axis over a second width corresponding to the first width in the imaging optics. The first width can extend transversely to the optical axis in the object plane.

The second width can extend transversely to the optical axis at the location of the imaging optics, for example in an imaging plane or principal plane of the imaging optics. The second width can (e.g. in the case of a substantially collimated beam of the ablative light) be substantially equal to the first width. The second width can (e.g. in the case of a divergent beam of the ablative light) be enlarged by beam divergence in comparison to the first width. The correspondence of the second width to the first width can consist in a proportionality of the widths. The proportionality factor can be equal to 1 or greater than 1.

The light of the laser can be formed for ablation. The light can be formed to cause a localised removal or modification of material due to a high heat effect and/or plasma formation. The ablative light can be formed to cause an ablation on the workpiece taken up in the holder in the image plane. A surface or a section plane of the workpiece can be arranged by means of the holder in the image plane.

The workpiece can comprise glass and/or be a glass body. The surface can be a glass surface. The glass can be a silicate glass.

The ablative effect of the light can be determined by its wavelength, pulse duration, pulse rate (or repetition rate), pulse energy, radiation output, fluence and/or intensity. The radiation output can pertain to the pulse power. The pulse power can be the ratio of pulse energy and pulse duration. The fluence can be the pulse energy per effective surface. The intensity can be the pulse power per effective surface.

The interfering beams can be the lowest non-suppressed orders of diffraction. The spacing of the beams can be achieved in that the beams do not overlap in the imaging optics.

The workpiece can be arranged movably in the image plane perpendicular to the lines. For example, large-scale structures can be produced. The large-scale structures can be assembled by line-precise continuation of different ablation pulses. Alternatively or in combination, the large-scale structures can be assembled by ablation pulses substantially statistically distributed on the surface of the workpiece. In both cases the ablation pulses can overlap on the surface of the workpiece.

The holder can be formed to move the workpiece parallel to the image plane, and for example perpendicular to the imaged equidistant lines, at a steady feed rate. For example, homogeneous large-scale structures can be produced. The steady feed rate can be substantially and/or at least temporarily constant.

A repetition rate r of the pulsed laser and the feed rate v of the holder can be synchronised. For example, the relationship $v = r \cdot b \cdot n$ can exist, at least temporarily, between the repetition rate r and the feed rate v for an integer n. In this, b can be a periodicity of the imaged equidistant lines.

The repetition rate can be 10 Hz to 5 kHz, e.g. 100 Hz to 1 kHz. The pulse duration can be 10 ns to 100 ns, for example 20 ns.

The line structure produced by consecutive pulses can overlap. A feed per pulse, $b \cdot n = v/r$, can be smaller than a width Y on the image side. For example, the feed can be $0.9 \cdot Y$ to $1.0 \cdot Y$.

Alternatively or in addition, the feed can be a fraction of the width Y on the image side. The feed $b \cdot n$ can be Y/m for $m = 2, 3, 4, \ldots$. Thus by multiple application of the ablative light, a desired extension of the line structure in the workpiece, for example parallel to the optical axis, can be achieved.

The line structure can be continued adhering to the image-side periodicity b up to a desired extension. Furthermore, the line structure can be continued to a desired area by a meandering process.

Alternatively or in addition, a scanner can be arranged behind the imaging optics, or as part of the imaging optics. The scanner can be formed to offset the imaged equidistant lines in one or two dimensions, for example for the aforesaid continuation of the periodic line structure.

The phase mask can be formed to suppress all even orders of diffraction, including the zeroed order.

The non-suppressed orders of diffraction can run symmetrically to the optical axis. Alternatively or in addition, the imaging optics can be arranged symmetrically to the optical axis. The imaging optics can be in mirror symmetry to a plane defined by the phase mask (or the equidistant lines) and the optical axis.

The imaging optics can capture two non-suppressed orders of diffraction, for example the first two orders of diffraction. The suppressed order of diffraction can be the zeroed order of diffraction. The phase mask can be arranged in a "+1/−1" configuration (e.g. with regard to the laser or its beam path). Furthermore, the phase mask can suppress a second order of diffraction, e.g. any even order of diffraction. The "+1/−1" configuration can facilitate a consistent output or intensity of the two interfering beams of the off-axis light.

Alternatively, the suppressed order of diffraction can be a first order of diffraction. The phase mask can (e.g. with regard to the laser or its beam path) be arranged in a "0/−1" configuration. The "0/−1" configuration can facilitate a particularly efficient suppression of the paraxial light.

In all configurations a third (or higher) order of diffraction can be of negligibly small intensity, and/or be geometrically excluded (e.g. blocked) (for example by a lateral extension of the imaging optics).

The imaging optics can image in only one dimension. The imaging optics can image perpendicular to the equidistant lines.

The equidistant lines in the object plane and the imaged equidistant lines can have a substantially identical length. The equidistant lines in the object plane and/or the imaged equidistant lines in the image plane can have a length of approximately 10 mm to approximately 50 mm, for example 20 mm.

The imaging optics can image the plurality of equidistant lines into the image plane. The imaging can reduce. The imaging optics can (in the image plane) reduce perpendicular to the equidistant lines. A distance of the imaged lines can be smaller than the distance of the equidistant lines in the object plane. A distance of the imaged lines (i.e. their periodicity b) can be smaller than a resolving capacity of the human eye.

A factor of the reduction, $Y/X=b/g$, can be in the range $1/5$ to $1/100$, for example $1/10$ or $1/80$. A periodicity g of the equidistant lines in the object plane can be 2 µm to 200 µm, for example 25 µm. The periodicity of the equidistant lines in the object plane can be $g=d$ or $g=d/2$ at a periodicity d of the phase mask. The set of imaged equidistant lines can have a width Y on the image side in the image plane of 10 µm to 1 mm, for example 100 µm.

The periodicity d of the phase mask can be 5 µm to 500 µm, for example 50 µm. The periodicity b of the imaged equidistant lines can be 0.5 µm to 25 µm, for example 2.5 µm or 5 µm.

10 to 1000, for example 50, 80 to 100, 200 or 500 equidistant lines can be imaged per pulse.

The periodic line structure produced according to the imaged parallel lines can act in a diffusely scattering and/or diffractively reflective manner, for example for visible light, as a relief grating on the glass surface.

Only a few outer zones of the cylindrical lens spaced from the optical axis can be illuminated by the non-suppressed orders of diffraction and/or contribute to imaging in the image plane.

Furthermore, the device can have an amplitude mask arranged between the imaging optics and the image plane. The amplitude mask can be spaced from the image plane. The amplitude mask can be moved together or in parallel with the workpiece.

According to another aspect, a method for the ablative production of a periodic line structure on or in a workpiece is provided. The method comprises the step of generating ablative light by means of a pulsed laser; the step of arranging a phase mask in the beam path of the ablative light to produce a plurality of equidistant lines in an object plane and to suppress an order of diffraction parallel to the optical axis by interference, wherein the optical axis is perpendicular to the object plane; the step of imaging the object plane into an image plane by means of a cylindrical lens arranged on the optical axis and aligned parallel to the lines; and the step of arranging the workpiece in the image plane.

BRIEF DESCRIPTION OF THE DRAWINGS

Further features of the technique are described below on the basis of exemplary embodiments with reference to the enclosed drawings, wherein.

DETAILED DESCRIPTION

Figure 1:
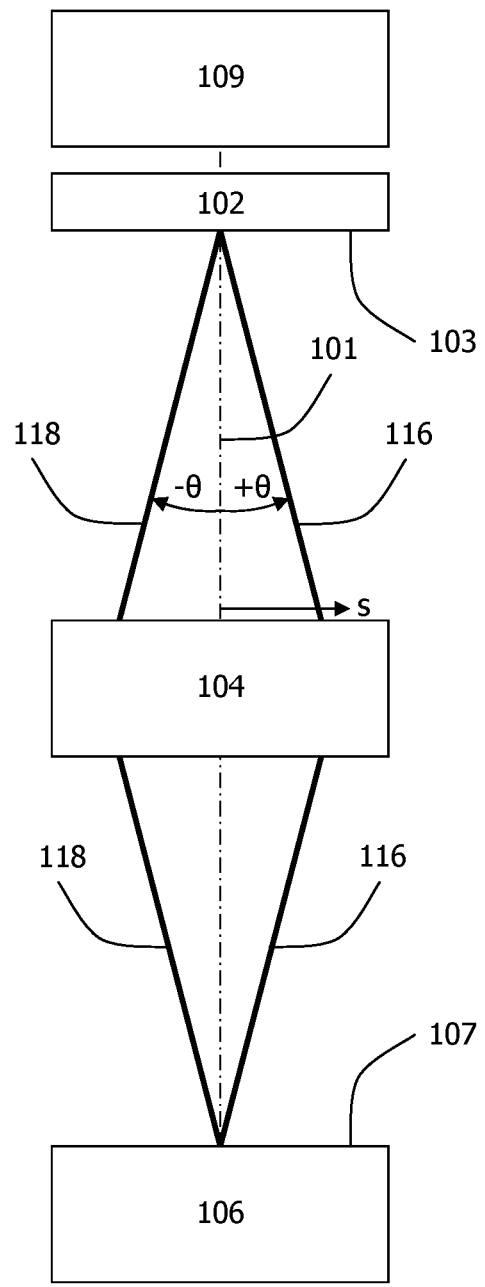
FIG. 1 shows a schematic block diagram of a device for producing a periodic line structure on a workpiece.

FIG. 1 shows a device generally designated by the reference sign 100 for the production of a periodic line structure.

The device 100 comprises a pulsed laser 109 for generating ablative light 110, a phase mask 102 arranged in the beam path of the ablative light 110 with an object plane 103, an imaging optics 104 arranged on an optical axis 101, and a holder 106, in order to arrange a workpiece 108 in an image plane 107 of the imaging optics 104.

The phase mask 102 produces a first line structure in the object plane 103 by interference. The object plane 103 is perpendicular to the optical axis 101. The object plane is in the near field of the phase mask 102 on the side of the phase mask 102 facing away from the laser 109.

The object plane 103 can be spaced a Talbot length or half a Talbot length (or an integer multiple of the half or whole Talbot length) from the plane of the phase mask.

In the far field of the phase mask 102 the interference suppresses an order of diffraction parallel to the optical axis 101. Emanating from the phase mask 102 (at least substantially) are two beams 116 and 118. The beams 116 and 118 run symmetrically to the optical axis 101.

The imaging optics 104 images the object plane 103 into the image plane 107 by means of the positive refractive power of a cylindrical lens. The imaging optics 104 optionally comprises other optical elements, for example each with positive refractive power. By using a doublet with two cylindrical lenses, with equal combined refractive power, imaging errors can be reduced in comparison with refractive power corresponding to a single cylindrical lens. The doublet can be asymmetrical. The cylindrical lenses can each be aligned with a convex side to the phase mask 102.

The object plane 103, the imaging optics 104 and the image plane 107 are arranged in relation to one another so that the first line structure is imaged to a reduced second line structure. The second line structure is created in the image plane 107 by interference of the two beams 116 and 118.

The ablative light can be monochromatic. The ablative light can comprise ultraviolet light. The pulsed laser 109 can generate ultraviolet light. The pulsed laser 109 can be an excimer laser, for example an argon fluoride laser. A wavelength of the light can be in the range from 126 nm to 351 nm. The wavelength of the light can be approximately 193 nm.

The first line structure and the second line structure each contain equidistant parallel lines, i.e. maxima of the intensity of the light. The lines are perpendicular to the drawing sheet in FIG. 1 and define a longitudinal direction. The longitudinal direction and the optical axis 101 span a plane of symmetry. With reference to the plane of symmetry, an angle θ and a distance s are defined for each of the beams 116 and 118, e.g. in a plane perpendicular to the optical axis in the case of imaging optics 104. Angle θ and/or distance s can have opposed signs on opposite sides of the plane of symmetry.

The imaging optics 104 can be formed to receive a coherence and/or a relative phase position of the two beams 116 and 118. An optical path length of the imaging optics 104 can (for example, due to uncorrected optical elements, e.g. on account of the cylindrical lens) be a function of the angle θ of the beams 116 and 118 falling on the imaging optics.

The phase mask 102 can distribute the ablative light (or at least a majority of this) at discrete angles, e.g. at two defined angles corresponding to the two beams 116 and 118. The imaging optics 104 can (e.g. on account of the illumination through the phase mask and/or on account of one or more apertures) only be used for the discrete angles. An influence of the angular dependence of the optical path length that is disadvantageous for sharpness and/or contrast can be avoided by this. A correction of the imaging optics, e.g. in respect of the angular dependence, can be omitted.

The two beams 116 and 118 can be symmetrical to the plane of symmetry. The two angles of the beams 116 and 118 can have the same value. The two beams 116 and 118 can thereby cover the same optical path length between phase mask 102 and workpiece 106 for a high-contrast interference.

Figure 2:
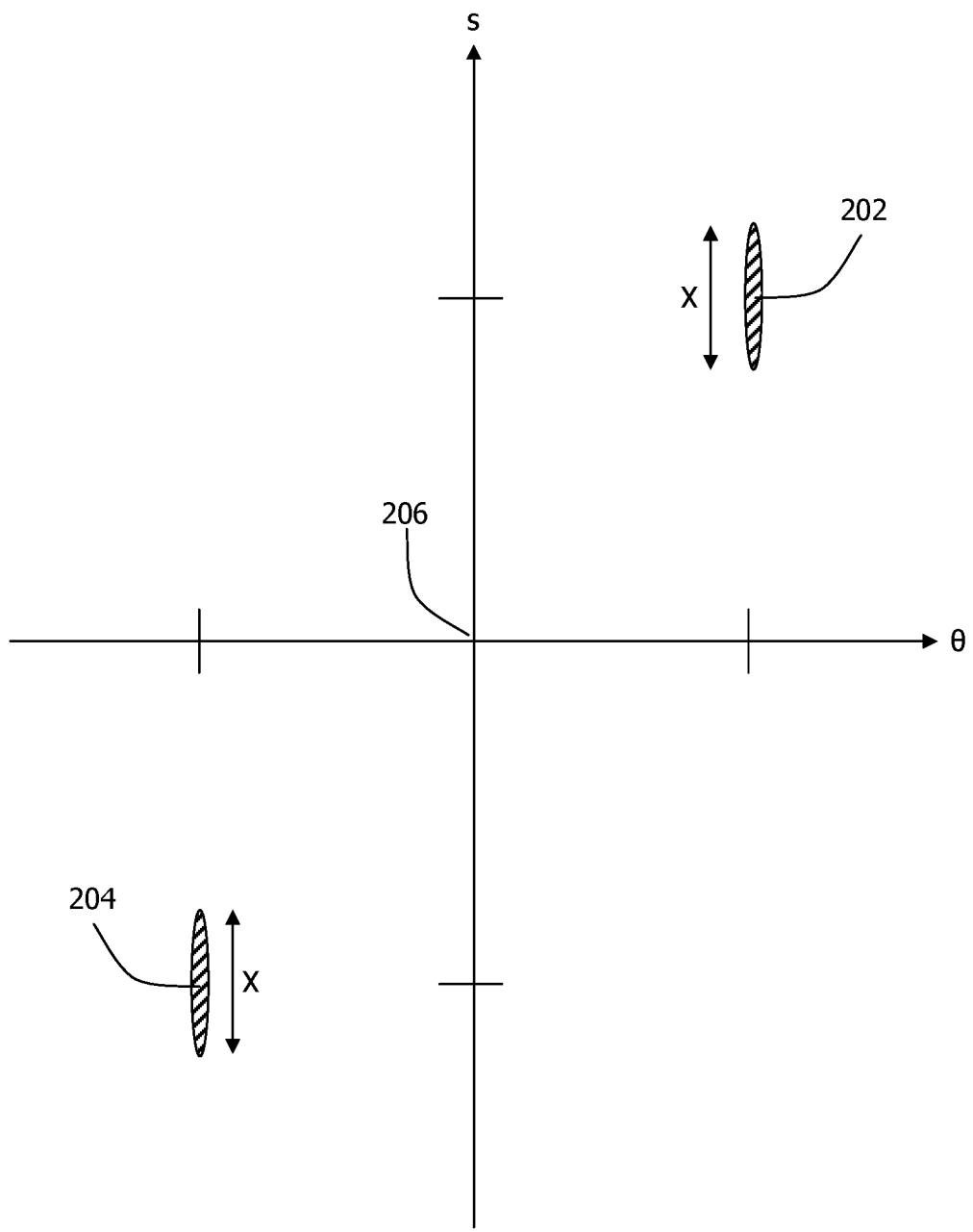
FIG. 2 shows schematically a distribution of the output of the light emanating from a phase mask in respect of angle and distance to the optical axis.

FIG. 2 shows schematically an output distribution 200 of the ablative light in a plane perpendicular to the optical axis 101 before or in the imaging optics 104. The distribution 200 of the output of the light is represented schematically with reference to the angle θ to the plane of symmetry and the distance s to the plane of symmetry. The distribution 200 shows a discretised distribution of the output with reference to the angle to the plane of symmetry.

An order of diffraction defines an acute angle θ>0 for the output 202 of the first beam 116. Another order of diffraction defines an acute angle θ<0 for the output 204 of the first beam 118. No paraxial light 206 gets into the imaging optics 104 (at least relative to the output of the off-axis light 202 and 204).

The cylindrical lens can (e.g. in the plane of symmetry) have a circular cross section. The cylindrical lens is not necessarily corrected (e.g. with reference to geometric imaging errors). Due to the discrete angular distribution 200, a corrective acylinder can be dispensed with in the imaging optics 104.

At least in exemplary embodiments, an optical path length of the imaging optics can (at least substantially) be a function only of the angle of the beams falling on the imaging optics relative to the optical axis or to the plane of symmetry. The optical path length of the imaging optics can be (at least substantially) independent of the distance s to the optical axis 101. Light of the phase mask can thereby be imaged over a width X, which overlaps with the optical axis 101.

Alternatively or in addition, the width X can be small, for example the width X can be small in relation to the object width G. Alternatively or in addition, the beams 116 and 118 cannot overlap in the imaging optics 104, so that the width X is small in relation to the distance s to the plane of symmetry, as shown schematically for the output distribution 200. The demand on the imaging optics 104 can be reduced further by this. For example, lighter or cheaper cylindrical lenses can be used in the imaging optics 104.

Figure 3:
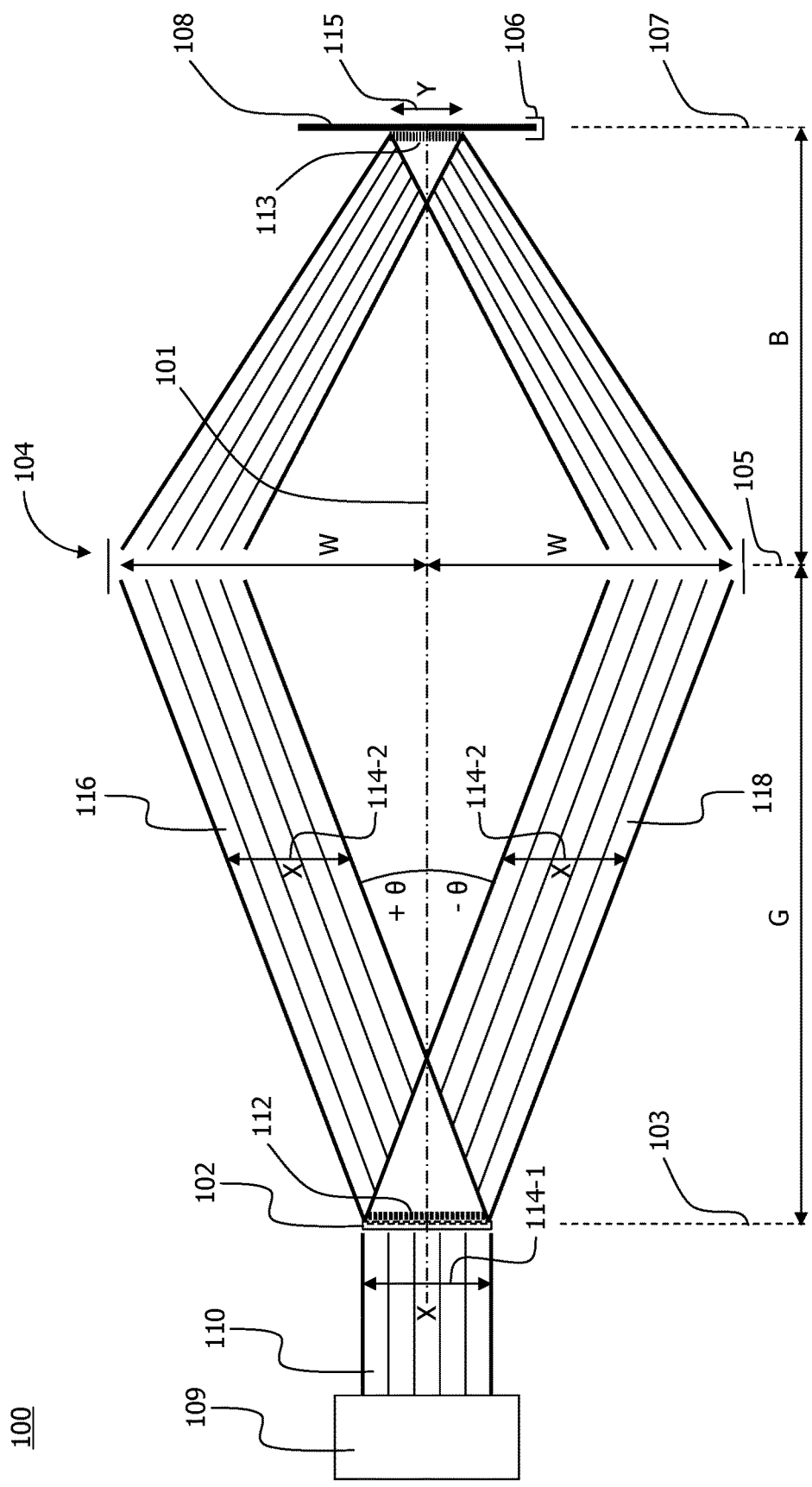
FIG. 3 shows schematically an exemplary embodiment of the device in FIG. 1.

FIG. 3 shows a schematic sectional view of an exemplary embodiment of the device 100. The plane of the sectional view shown in FIG. 3 is parallel to the optical axis 101 and perpendicular to the imaged equidistant lines 113.

In the exemplary embodiment of the device 100 shown in FIG. 3, the phase mask 102 produces the first line structure 112 in the object plane 103. Regardless of whether the first line structure 112 is present at all, the beams 116 and 118 are formed to create the ablative line structure by superimposition in the image plane 107.

FIG. 3 is schematically for the benefit of clarity. For example, the beam progression can have an intermediate focus (not shown in FIG. 3), e.g. between an imaging plane 105 and the image plane 107. Alternatively, the intermediate focus with convergent beams 116 and 118 can be between the object plane 103 and the imaging plane 105.

In the exemplary embodiment shown in FIG. 3, the two beams 116 and 118 are each (at least approximately) collimated beams, for example in that the beams 116 and 118 correspond to defined orders of diffraction, which are emitted by the phase mask at a defined diffraction angle θ to the optical axis. The width X of the beams 116 and 118 at reference sign 114-2 can substantially correspond to the width X illuminated by the laser 109 at reference sign 114-1.

With a small divergence of the beams 116 and 118, the width X at reference sign 114-2 can be greater than the illuminated width X at reference sign 114-1. For example, in the imaging plane 105 (or directly in front of the imaging optics 104) the width X can be a maximum of 10% greater than the width X in the object plane 103 (or directly behind the phase mask 102).

The beams 116 and 118 enclose with the optical axis 101 on the input side of the imaging optics 104 (at least approximately) a defined angle +θ or −θ. The imaging of the beams 116 and 118 by means of the imaging optics 104 utilises only one (at least approximately) discrete angular range. In addition, with a progression of the beams 116 and 118 symmetrical to the optical axis and an arrangement of the imaging optics 104 symmetrical to the optical axis 101, the imaged angles are (at least approximately) of equal value.

Imaging with only a single angular value can improve the interference of the imaged beams and/or reduce demands on the imaging optics 104. For example, a particularly sharp and/or high-contrast line structure can be made possible, although with a single cylindrical lens a distortion of a wavefront of the beams 116 and 118 would be expected.

The line structure can have a rectangular profile in the image plane 107 trans-verse to the equidistant lines. A high sharpness of the imaging can correspond to steep flanks of the rectangular profile. Alternatively, the line structure can have a sinusoidal intensity distribution in the image plane 107 transverse to the equidistant lines.

With a high contrast, intensity minima of the line structure can be substantially radiation-free, so that in the valleys of the intensity distribution the workpiece 108 remains unprocessed.

FIG. 3 shows an exemplary embodiment with beams 116 and 118 separated in the imaging optics. A distance W of the beams 116 and 118 from the plane of symmetry can be great in relation to the width X of the beams 116 and 118.

Figure 4:
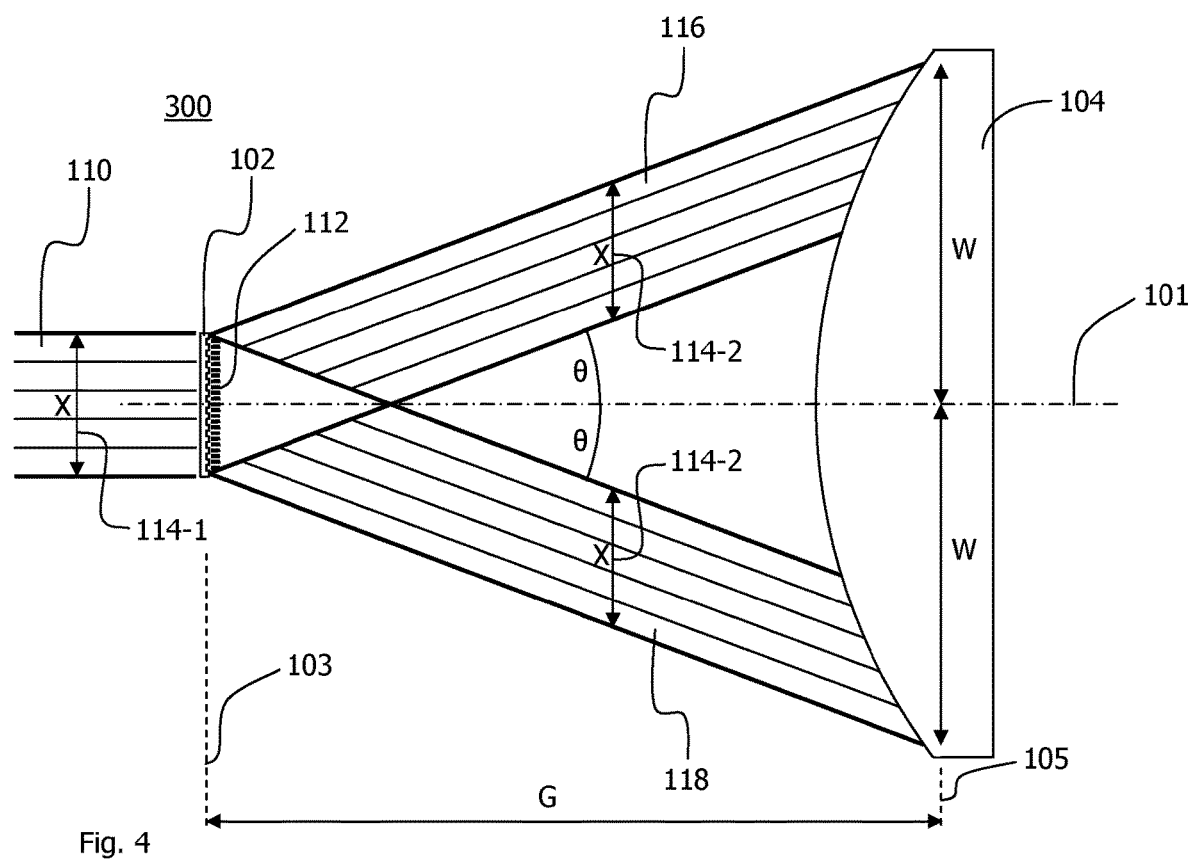
FIG. 4 shows a first configuration of a phase mask for the device in FIGS. 1 and 3 or the distribution in FIG. 2.
Figure 5:
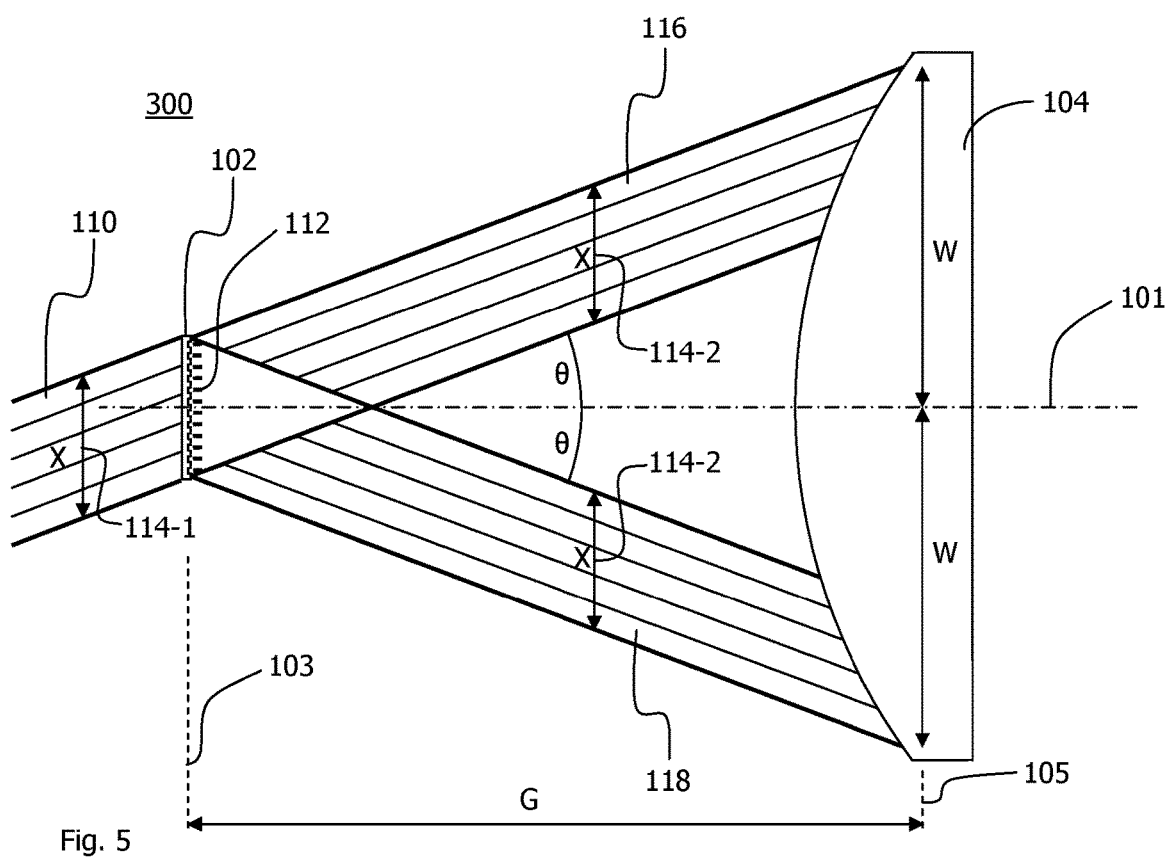
FIG. 5 shows a second configuration of a phase mask for the device in FIGS. 1 and 3 or the distribution in FIG. 2.

FIGS. 4 and 5 show a section 300 of the device 100 for exemplary embodiments of the phase mask 102. The imaging optics 104 comprises a cylindrical lens aligned parallel to the lines 112. A radius of the cylindrical lens is large in relation to the distance W of the beams 116 and 118 from the plane of symmetry in the imaging plane 105. The cylindrical lens 104 is not necessarily acylindrically corrected.

FIG. 4 shows a first configuration of the phase mask 102, in which the beams 116 and 118 correspond to the first two orders of diffraction +1 and −1. The first configuration can facilitate a symmetrical distribution of the output of the ablative light 110 to the two beams 116 and 118.

FIG. 5 shows a second configuration of the phase mask 102, in which the beam 116 corresponds to the zeroed order of diffraction and the beam 118 to a first order of diffraction. The second configuration can facilitate a complete suppression of paraxial light without dissipative apertures.

The cylindrical lens 104 permits extended processing of the workpiece 108 in the longitudinal direction. A processing region is further expanded by moving the workpiece by means of the holder 106. The holder 106 moves the workpiece 108 continuously in the image plane 107 with uninterrupted pulsed operation of the laser 109. Alternatively or in addition, the holder rotates the workpiece, for example to process a curved surface. The rotation takes place about the instantaneous normal intersection point of the current processing region.

For example, the workpiece is moved continuously in the transverse direction, so that with each pulse of the laser 109 in an overlapping region of processing with a region processed by the preceding pulse, the parallel lines imaged are congruent. Since the product of pulse duration and feed rate is small in comparison with the width of the imaged lines, time-consuming start-up and deceleration processes can be avoided.

By using the phase mask 104, a fluence of the laser 109 can be utilised almost com-pletely for processing the workpiece 108.

The workpiece 108 can comprise glass. The technique can be used for identification or surface processing of hobs with glass ceramic, spectacle lenses or primary packagings.

In each of the exemplary embodiments an amplitude mask can be arranged between workpiece 108 and imaging optics 104, e.g. in the image plane 107. The amplitude mask can facilitate a representation composed of the line structure. The representation can be a graphic, a logo, a pictogram or a machine-readable code. The machine-readable can be one-dimensionally structured (e.g. as a barcode) or can be two-dimensionally structured (e.g. as a QR code).

The invention claimed is:

1. A device for the ablative production of a periodic line structure on a workpiece, comprising:
   a pulsed laser for generating an ablative light;
   a phase mask, which is arranged in the beam path of the ablative light and is formed to produce a plurality of equidistant parallel lines in an object plane by interference and to suppress an order of diffraction parallel to an optical axis, wherein the optical axis is perpendicular to the object plane;
   an imaging optics arranged on the optical axis with a cylindrical lens, which is aligned parallel to the lines and is formed to image the object plane into an image plane; and
   a holder, which is formed to arrange the workpiece in the image plane.

2. The device according to claim 1, wherein the non-suppressed orders of diffraction enclose discrete angles with the optical axis and the cylindrical lens has no acylindrical correction.

3. The device according to claim 1, wherein the non-suppressed orders of diffraction and the imaging optics lie symmetrically to the optical axis.

4. The device according to claim 1, wherein the phase mask is formed to produce the plurality of equidistant parallel lines in the object plane over a first width, and wherein the imaging optics is arranged on the optical axis, so that non-suppressed orders of diffraction in the imaging optics are spaced from the optical axis over a second width corresponding to the first width.

5. The device according to claim 1, wherein the workpiece is arranged movably in the image plane perpendicular to the lines.

6. The device according to claim 1, wherein the holder is formed to move the workpiece parallel to the image plane and perpendicular to the imaged equidistant lines at a steady feed rate.

7. The device according to claim 6, wherein a repetition rate, r, of the pulsed laser and the feed rate, v, of the holder are synchronized, so that $$v = r \cdot b \cdot n \text{ for an integer } n,$$

wherein b is a periodicity of the imaged equidistant lines.

8. The device according to claim 6, wherein a feed between two consecutive pulses is an integer fraction of a width on an image side.

9. The device according to claim 1, wherein the imaging optics reduces parallel to the equidistant parallel lines.

10. The device according to claim 1, further comprising:
    an amplitude mask arranged between the imaging optics and the image plane.

11. A method for the ablative production of a periodic line structure on a workpiece, comprising:
    generation of an ablative light by means of a pulsed laser;
    arrangement of a phase mask in the beam path of the ablative light to produce a plurality of equidistant parallel lines in an object plane and to suppress an order of diffraction parallel to an optical axis by interference, wherein an optical axis is perpendicular to the object plane;
    imaging of the object plane into an image plane by means of a cylindrical lens, which is arranged on the optical axis and aligned parallel to the lines; and
    arrangement of the workpiece in the image plane.

\* \* \* \* \*